United States Patent [19]
Kusunoki

[11] Patent Number: 5,763,957
[45] Date of Patent: Jun. 9, 1998

[54] VEHICULAR TRUNK UNLATCHING DEVICE HAVING A CIRCUIT FOR DISABLING AN UNLATCHING OPERATION IN RESPONSE TO AN ARMING OF AN ANTI-THEFT SYSTEM

[75] Inventor: Kiichi Kusunoki, Atsugi, Japan

[73] Assignee: Nissan Motor Co., Ltd., Yokohama, Japan

[21] Appl. No.: 678,135

[22] Filed: Jul. 11, 1996

[30]  Foreign Application Priority Data

Feb. 8, 1996 [JP] Japan .................................. 8-046605

[51] Int. Cl.⁶ .................................................. B60R 25/00
[52] U.S. Cl. .......................................... 307/10.2; 180/287
[58] Field of Search ................................ 307/10.1–10.6;
180/287, 289; 340/425.5, 426, 438, 825.3,
825.32, 825.34, 825.69, 825.72; 70/237,
264, 240, 241, 252, 255, DIG. 30; 361/171,
172; 224/400, 315; 364/423.098

[56]  References Cited

U.S. PATENT DOCUMENTS

| 4,322,959 | 4/1982 | Mochida | 70/264 |
| 4,477,806 | 10/1984 | Mochida et al. | 340/825.32 |
| 5,134,392 | 7/1992 | Takeuchi et al. | 340/825.69 |
| 5,387,897 | 2/1995 | Bechtle et al. | 340/426 |
| 5,543,776 | 8/1996 | L'Esperance et al. | 180/287 |

*Primary Examiner*—Richard T. Elms
*Attorney, Agent, or Firm*—Foley & Lardner

[57] ABSTRACT

In an anti-theft warning apparatus in a trunk unlatching device for a vehicle, a drive switch is inserted between a trunk opener cancel switch and a trunk opener switch. The drive switch is activated so as to make an activation of the trunk opener cancel switch ineffective when an anti-theft warning function is set, i.e., an armed state is established in the vehicle.

31 Claims, 14 Drawing Sheets

ALARM RELAY ON OUTPUT

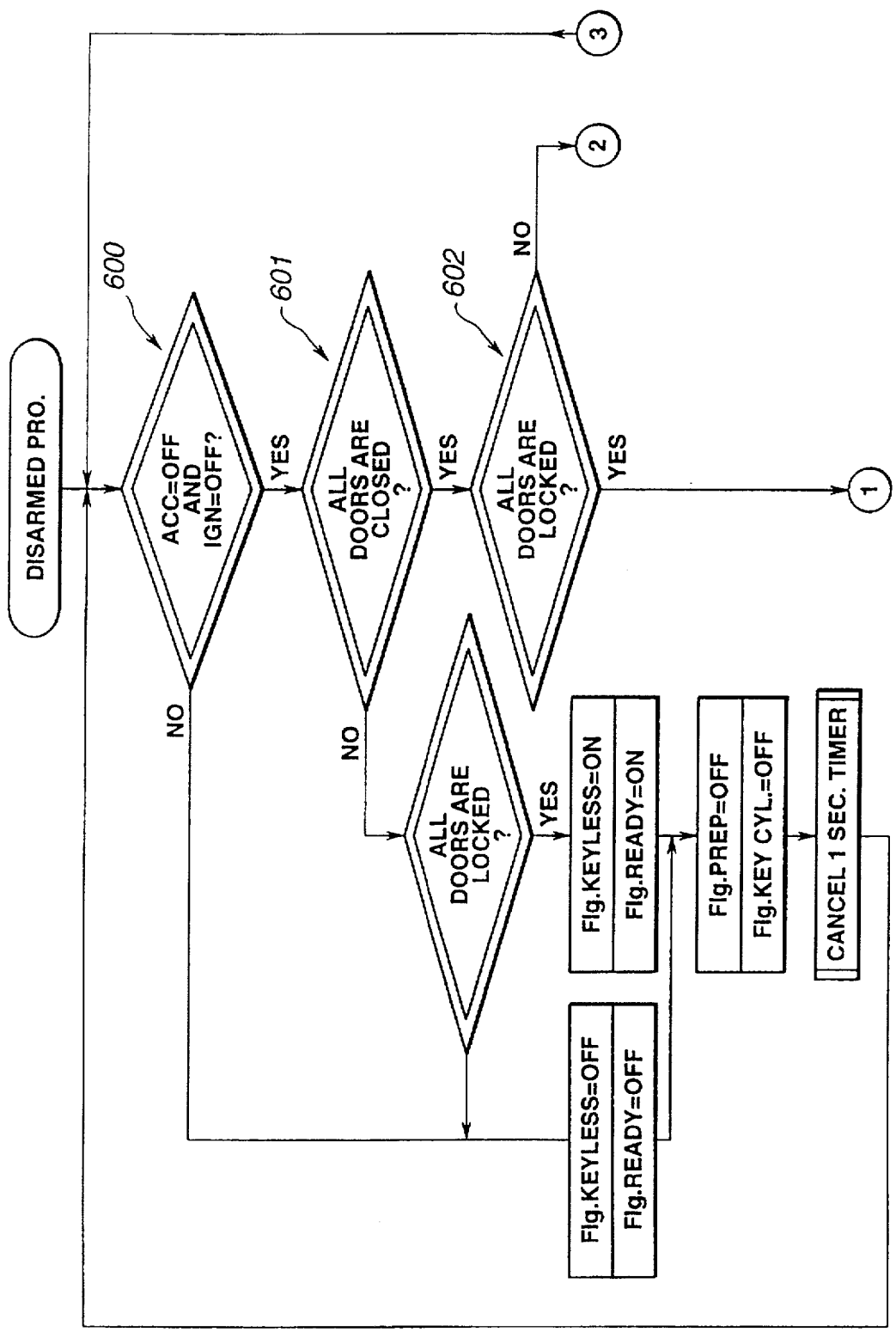

1

VEHICULAR TRUNK UNLATCHING DEVICE HAVING A CIRCUIT FOR DISABLING AN UNLATCHING OPERATION IN RESPONSE TO AN ARMING OF AN ANTI-THEFT SYSTEM

BACKGROUND OF THE INVENTION

The present invention relates to an anti-theft warning apparatus for a vehicular trunk unlatching device, the anti-theft warning apparatus having an improved anti-theft warning characteristic on the vehicular trunk using a signal derived from the anti-theft warning apparatus installed within a passenger compartment.

An electromagnetic opener type vehicular trunk unlatching device has been proposed wherein in order to unlatch a vehicular trunk, an activation of a switch located at a driver's seat side within a passenger compartment permits the unlatching of the vehicular trunk without a direct insertion of a key, into a key cylinder of the trunk unlatching device. However, this electromagnetic opener type vehicular trunk unlatching device lacks the anti-theft warning characteristic, since a person who does not carry the key can open the trunk by only operating the switch located at the driver's seat side.

Therefore, a, so-called, trunk opener cancel switch is installed within a lockable glove box disposed in the passenger compartment so as to inhibit the unlatch of the trunk.

In another previously proposed electromagnetic opener type vehicular trunk unlatching device in which the trunk opener cancel switch is added, a trunk unlatch inhibit state can be set only when two processes are carried out, namely, the trunk opener cancel switch is in the off state (turned off) and the glove box in a closed state is locked.

If the two processes are so troublesome that the setting of the trunk unlatch inhibit state through the trunk opener cancel switch is not carried out, a thief (some person) who cracks a window glass of a door or windshield into the passenger compartment or makes a forceful unlatch to invade into the passenger compartment can easily unlatched the trunk using a trunk opener switch installed within the passenger compartment. In a vehicle in which an anti-theft alarming system is incorporated, the unlatch of the trunk cannot be blocked even if the anti-theft alarm is operating when the intrusion of the theft In the passenger compartment occurs to try to unlatch the vehicular trunk.

SUMMARY OF THE INVENTION

It is, therefore, an object of the present invention to provide an vehicular trunk unlatching device achieving an improvement in an anti-theft warning characteristic of a vehicular trunk without troublesome operations.

The above-described object can be achieved by providing a vehicular trunk unlatching device, comprising:

a trunk opener switch;

a trunk unlatching actuator associated with said trunk opener switch so as to be actuated into an unlatching position of a vehicular trunk in response to an activation of the trunk opener switch; and an anti--theft warning apparatus, said anti-theft warning apparatus comprising:

a first canceling circuit activated to make the activation of said trunk opener switch ineffective so as to prevent the trunk unlatching actuator from being actuated into the unlatching position;

a first detector arranged for detecting whether an anti-theft warning function in the anti-theft warning apparatus is set;

2 a drive circuit activated to make the activation of said trunk opener switch ineffective; and a second canceling circuit activated to make the activation of said trunk opener switch ineffective via said drive circuit so as to prevent the trunk unlatching actuator from being actuated into the unlatching position only when said first detector detects that the anti-theft warning function is set.

The above-described object can also be achieved by providing a method for carrying out an anti-theft warning function in a vehicular trunks unlatching device in a vehicle with a keyless entry system having an anti-theft warning apparatus, said vehicular trunk unlatching device comprising; a trunk opener switch; a trunk unlatching actuator associated with said trunk opener switch so as to be actuated into an unlatching position of a vehicular trunks in response to an activation of said first manually operable switch; and said anti-theft warning apparatus having a canceling circuit, installed within a lockable glove box in a vehicle passenger compartment so as to enable an activation of said canceling circuit when the lockable glove box is open, said canceling circuit being turned off so as to make the activation of said trunk opener switch ineffective to prevent the trunk unlatching actuator from being actuated into the unlatching position and being turned on so as to make the operation of said trunk opener switch effective, and a drive circuit interposed between said trunk opener switch and said canceling circuit, said method comprising the steps of:

detecting whether the anti-theft warning function is set;

turning off the drive circuit so as to make the activation of said trunk opener switch ineffective when detecting that the anti-theft warning function is set.

BRIEF DESCRIPTION OF THE DRAWINGS

FIGS. 6A and 6B are integrally a flowchart for explaining a disarmed processing state in an operation of the anti-theft warning apparatus shown in FIG. 1.

BEST MODE FOR CARRYING OUT THE INVENTION

Reference will hereinafter be made to the drawings in order to facilitate a better understanding of the present invention.

Figure 1:
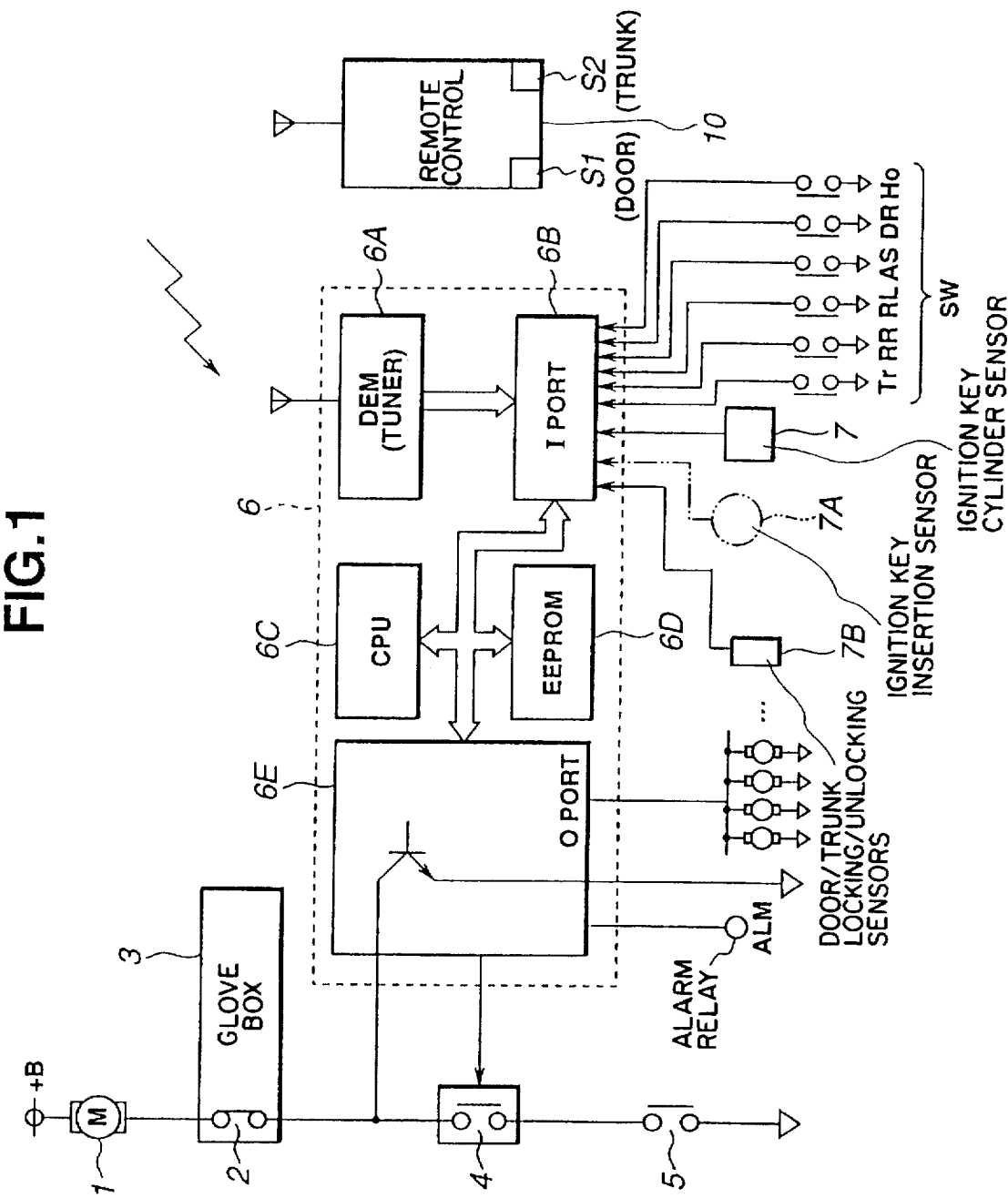
FIG. 1 is a schematic circuit block diagram of a trunk unlatching device in a vehicular trunk in combination with a keyless entry system to which an anti-theft warning apparatus in a preferred embodiment according to the present invention is applicable.

FIG. 1 shows an anti-theft warning apparatus in a vehicular unlatching device in a preferred embodiment according to the present inventions the anti-theft warning apparatus being incorporated into a keyless entry system. It is noted that a door locking and unlocking and trunk unlatching control system is also incorporated into the keyless entry system.

Therefore, a vehicular side keyless entry system carries out locking and unlocking controls of vehicular doors, latching and unlatching controls of the trunk, and executes an anti-theft warning function to be described later.

In FIG. 1, a remote controller (also called, portable, wire-less transmitter) 10 includes two push-buttons, namely, S1 and S2, S1 being pushed to indicate that a door lock request is issued and being further pushed to indicate that a door unlock request is issued and S2 being pushed to indicate that a trunk unlatch request is issued. An operation signal indicating that a request of operation on either the vehicular doors or the vehicular trunk is formed according to either of operations on the two push-buttons S1 or S2 and is transmitted in a form of an electromagnetic wave from its antenna. The operation signal corresponds to a keyless input code.

A receiver 6 installed within the vehicle passenger compartment receives the transmitted signal from the remote controller 10, compares the received keyless input ode with a stored preset code, and a CPU (Central Processing Unit) 6C outputs a corresponding lock, unlock, or unlatch (command) signal to any corresponding locking and unlocking actuator including the trunk unlatching actuator 1 when the comparison result indicates that the keyless input code is matched with the preset code.

The receiver 6 includes an antenna, a demodulator (DEM) (or tuner) 6A, an Input port 6B, a CPU 6C, a memory having an EPROM (Electrically Erasable Programmable Read Only Memory) 6D, and an Output port 6E, and a common bus.

According to a detection result of an ignition key cylinder insertion sensor 7 connected to the Input port 6B, the door lock or unlocks according to the content of transmission of the keyless input code from the remote controller 10 and the trunk unlatch control, and the anti-theft warning function using an alarm sound (alarm relay output.) are carried out.

An ignition key sensor 7A which detects whether the ignition key is inserted into the key cylinder (IGN=ON) may be connected to the Input port 6B in place of the sensor 7.

It is noted that the Input port 6B is connected to: a plurality of door switches (DR SW, AS SW, RL SW, and RR SW) arranged for detecting whether all of the doors are closed, any door is open, which door is closed, and which door is open; and a hood switch Ho SW arranged for detecting whether an engine hood is open or closed; and a plurality of door locking and unlocking and trunk (latching and unlatching) position sensors 7B arranged for detecting whether the corresponding door of the vehicle doors is locked or unlocked and whether the trunk is latched or unlatched in addition to the ignition key insertion sensor 7.

Referring to FIG. 1, a bias power supply (+B) is connected to the actuator (comprising a DC motor) 1 which is actuated into its unlatching position when receiving the bias power supply (+B). The trunk unlatching actuator 1 is, then, electrically connected to a trunk opener cancel switch 2, a drive switch (drive circuit) 4, and a trunk opener switch 5.

The opener cancel switch 2 is installed within a lockable glove box 3 disposed within the passenger compartment. The cancel switch (a first canceling circuit) 2 is manually turned off (activated) when a trunk unlatch inhibit state, such that the activation of the trunk opener switch 5 is made ineffective is desired to be carried out by a vehicular occupant. The trunk opener switch 5 is an operational switch to unlatch the trunk, and is installed on an instrument panel of the passenger compartment; The trunk opener switch 5 is turned on (activated) by the occupant of the compartment when he desires the trunk to be unlatched, with the opener cancel switch 2 in the on state.

The drive switch 4 is installed at a rear side of the instrument panel or located outside the passenger compartment so as not to provide an easy access thereto.

The drive switch 4 receives a drive signal to turn on or off according to the content of the drive signal derived from the Output port 6E. The Output port 6E is connected to the plurality of door locking and unlocking actuators so as to actuate the corresponding door locking and unlocking actuators into locking and unlocking positions.

It is noted that the drive switch (circuit) 4 is turned off (activated) when the anti-theft warning apparatus in the controller (receiver) 6 Is in an armed (processing) state as described below so as to make the activations of both of the trunk opener switch 5 and the cancel switch 2 ineffective. One end of the drive switch 4 is connected via the cancel switch 2 to the trunk unlatching actuator 1 and the other end of the drive switch 4 is connected via the trunk opener switch 5 to a ground voltage reference. A drive end of the drive switch 4 is connected to the Output port 6E.

If the lockable glove box 3 is opened to turn off the cancel switch 2, the circuit around the trunk unlatching actuator 1 is open so that even if the trunk unlatch request (or command) from the remote controller 10 is issued from the receiver 6 or the trunk opener switch 5 is activated to turn on, time trunk unlatching actuator 1 is not operated and the trunk unlatch cannot be achieved.

In a case where, with the truck opener cancel switch 2 turned on, the trunk unlatch caused by the actuator 1 is enabled; If push-button S2 of the remote controller 10 is activated to request the receiver 6 to output the trunk unlatch request signal to the actuator 1 to be actuated into its unlatching position for the trunk, the trunk unlatch request signal is outputted via, for example, a transistor in the Output port 6E connected across the drive switch 4 and the trunk opener switch 5.

However, since the opener switch 5 is connected to the plus bias supply (+B) via the actuator 1 and via the drive switch 4 as shown in FIG. 1, whether the activation of the opener switch 5 is made effective or ineffective is dependent on the open (turned on) or closed (turned off) state of the drive switch 4.

It is noted that although the anti-theft warning apparatus is incorporated into the receiver 6, the anti-theft warning apparatus may solely be installed within the passenger compartment. It is also noted that the drive signal generated from the receiver 6 on the keyless entry system is supplied across the drive switch 4 and the trunk opener switch 5 via, for example, the transistor in the Output port 6E as the unlatch request for the trunk.

Figure 2:
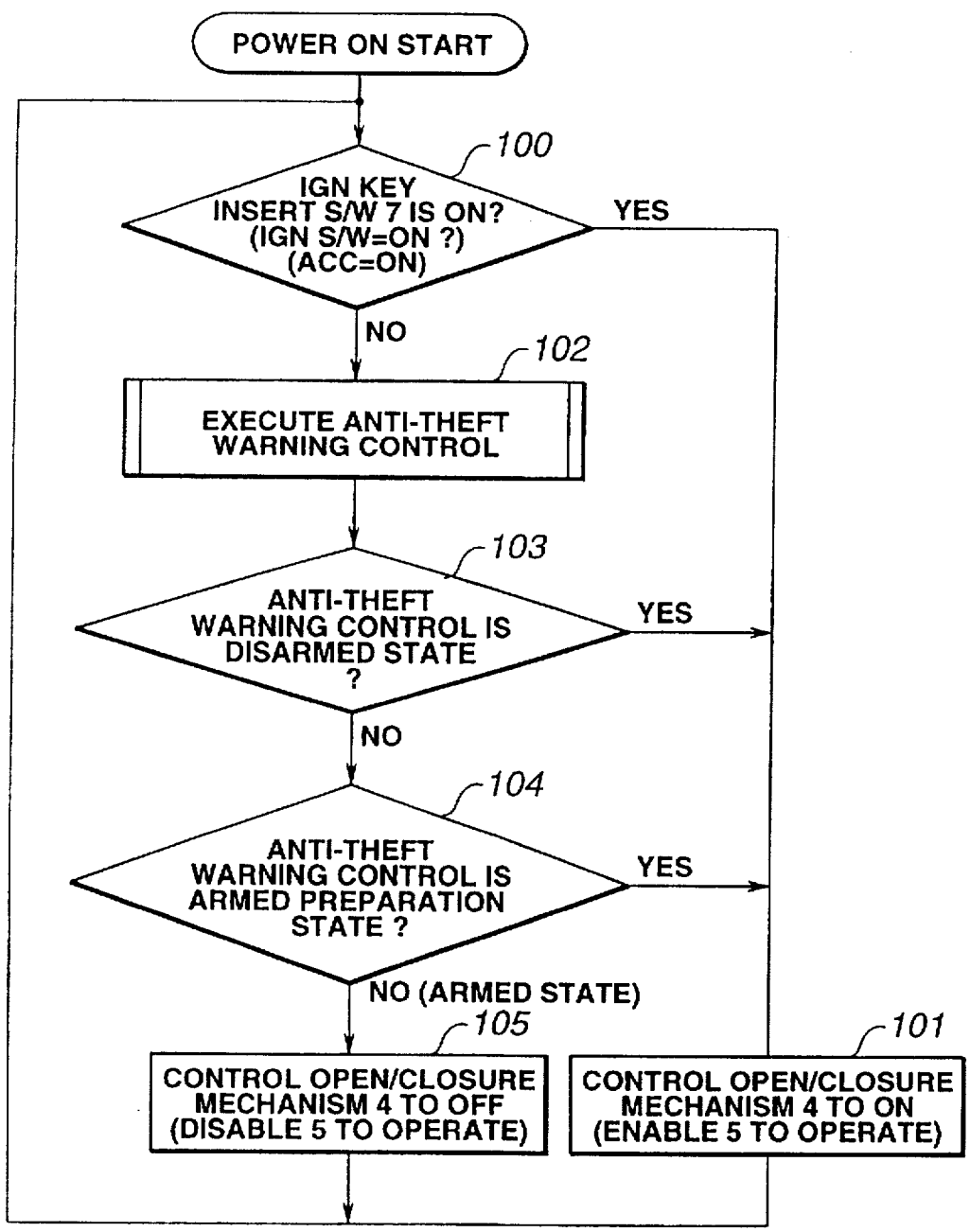
FIG. 2 is an operational flowchart for explaining an operation of a control of a on or off state of a drive switch in the embodiment shown in FIG. 1

Next, FIG. 2 shows an on-and-off control flowchart for the drive switch 4 in the trunk unlatching device shown in FIG. 1 executed by the anti-theft warning apparatus.

At a step 100, the CPU 6C in the receiver 6 determines whether its vehicular engine ignition key is inserted into an ignition key cylinder according to a detection signal of the ignition key insertion detector (IGN S/W) 7. If the ignition key is inserted into the ignition key cylinder (Yes) (IGN=ON) at the step 100 and ACC=ON, the CPU 6C determines that a user of the vehicle, i.e., a user of the keyless entry system is within the vehicle (passenger) compartment or is present at a place surrounding the vehicle and the routine goes to a step 101. In addition, the CPU 6C at the step 100 determines whether a vehicular accessory switch is turned on (ACC=ON), the vehicular accessory switch being associated with a vehicular accessory (for example, an air conditioner). (ACC=ON means that the accessory is activated).

At the step 101, the CPU 6C commands the Output port 6E to output the drive signal to turn on the drive switch 4 so that the trunk is enabled to be unlatched by means of the trunk unlatching actuator 1 in response to an activation of the trunk opener switch 5.

On the other hand, if the CPU 6C determines that the ignition key is not inserted into the key cylinder (No) at the step 100, the routine goes to a step 102.

At a step 102, the CPU 6c carries out such a series of processing as described below.

The receiver 6 also serves as a controller of the anti-theft warning apparatus.

That is to say, when the results of door lock and door unlock controls and the trunk unlatch control indicate that the vehicle doors are locked, an armed preparation processing step is started as the beginning of the anti-theft warning control. This armed preparation process is for approximately 30 seconds. If during this time no operation for the vehicle is determined by the CPU 6C to be carried out, the anti-theft warning apparatus is transferred to an armed processing state. If the CPU 6C during this time determines that at least one operation for the vehicle (for example, the vehicle door unlocking operation is carried out and/or the trunk unlatching operation is carried out) is carried out, the control in the anti-theft warning apparatus is transferred to a disarmed processing state (the details of the disarmed processing will be described later).

Under the armed processing state, an alarm relay output signal is outputted so as to warn the user of the intrusion occurrence in the passenger compartment when some one has tried to unlock any door or to unlatch the trunk with another means except the use of the remote controller 10 or keyless input code on the door lock and door unlock and on the trunk unlatch.

The series of processing at the step 102 will further be described later.

At the next step 103, the CPU 6C determines whether the control in the anti-theft warning apparatus is in the disarmed processing state. If the CPU 6C determines that the control In the anti-theft warning apparatus is transferred into the disarmed processing state (Yes) at the step 103 the routine goes to the step 101 so that the drive switch 4 is turned on since the CPU 6C determines that the user of the vehicle is still present within the passenger compartment or at the place surrounding the vehicle.

If the CPU 6C determines that the control in the anti-theft warning apparatus is not in the disarmed processing state (No) at the step 103, the routine goes to a step 104 in which the CPU 6C determines whether the anti-theft warning apparatus is in an armed preparation processing state.

If the CPU 6C determines that the control of the anti-theft warning apparatus Is in the the armed preparation processing state (Yes) at the step 104, the routine goes to the step 101.

If the CPU 6C determines that the control in the anti-theft warning apparatus is not in the armed preparation state (No) at the step 104, the CPU SC determines that the control in the anti-theft warning apparatus is in an armed processing state and the routine goes to a step 105 in which the drive switch 4 is turned off so that the activation(s) of (both of) the trunk opener switch 2 (and the trunk opener cancel switch 5) is (are) made ineffective (disabled). The activation of the trunk opener cancel switch 2 described above includes the turn on of the trunk opener cancel switch 2.

In the embodiment, the drive switch 4 is turned off in response to the drive signal from the anti-theft warning apparatus indicating that the control of the anti-theft warning apparatus is in the armed processing state, i.e., the anti-theft warning function is set since the CPU 6C determines that the user has separated from the vehicle with a clear purpose so that the trunk unlatch using the trunk unlatching actuator 1 in response to the activation of the opener switch 5 (and also the opener cancel switch 2) is inhibited (made ineffective). Thus, if someone invades into the vehicle passenger compartment by cracking the window glass (windshield) and turns on the opener cancel switch 2 within the glove box and/or turns on the trunk opener switch 5, the trunk cannot be unlatched so that the trunk unlatching device with a higher anti-theft warning characteristic can be achieved.

In addition, since the drive switch 4 is turned on so as to make the activation of the trunk opener switch 5 effective with the cancel switch 2 turned on if the control in the anti-theft warning apparatus is in the armed preparation processing state, no trouble is given to the user (or occupant) who is operating (loading or unloading a baggage on the trunk) using the trunk for a predetermined period of time from a time at which the door locking operation with the keyless entry system. with the door lock key, or without use of the lock key are carried out.

Next, the control routine executed by the anti-theft warning apparatus in the embodiment shown in FIG. 1 after the user is separated from the vehicle with the vehicle door locks by a door key, without use of the door key, or with the keyless input code corresponding to the request of the door locks will be described below.

Figure 3:
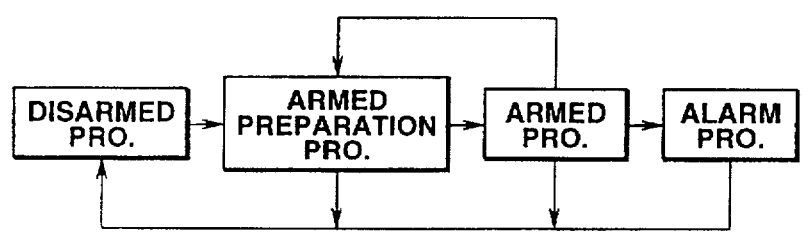
FIG. 3 is a control mode transfer diagram in the anti-theft warning apparatus incorporated in a receiver shown in FIG. 1.

FIG. 3 shows a control processing mode transfer diagram of the anti-theft warning apparatus which is carried out by the receiver 6 at the step 102 of FIG. 2.

Figure 5:
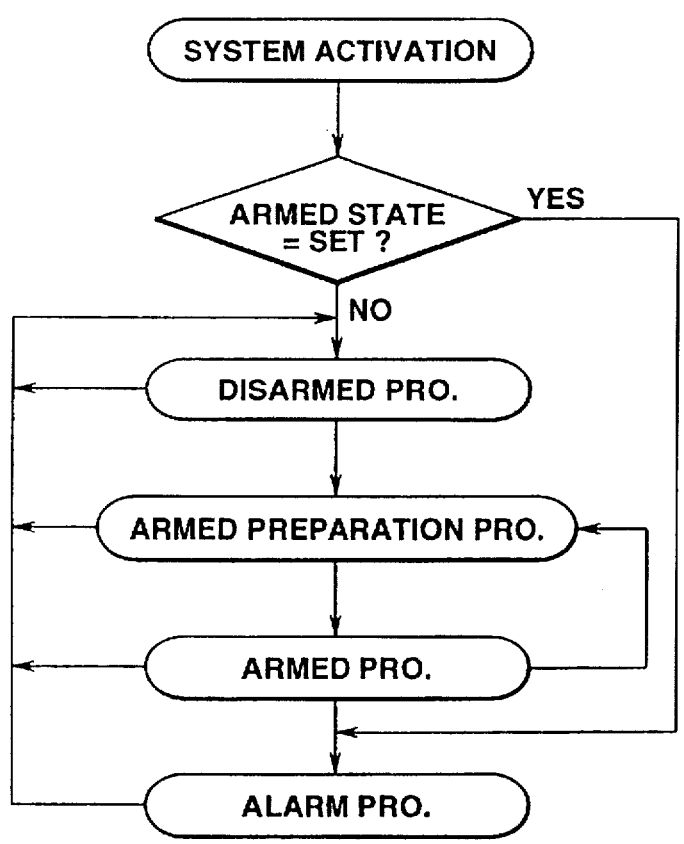
FIG. 5 is a main flowchart executed in the anti-theft warning apparatus in the embodiment shown in FIG. 1.

FIG. 5 shows a main routine of the anti-theft warning apparatus executed in the embodiment.

The control of the anti-theft warning apparatus may be started at any processing step if a system activation has already been carried out. The control modes in the anti-theft warning apparatus are divided into four states: a) the disarmed processing state; b) the armed preparation processing state; c) the armed processing state; and d) an alarm processing state.

It is noted that if the flag of ARMED STATE is set (ARMED STATE=SET), the CPU 6C determines that the anti-theft warning function is set so that the CPU 6C commands to output the drive signal to the drive switch 4 of FIG. 1 so as to turn off the drive switch 4, thus the activations of both trunk opener switch 5 and the trunk opener cancel switch 2 being made ineffective.

After the alarm processing state, the control in the anti-theft warning apparatus is generally returned to the disarmed processing state.

Next, the content of each processing state in the control of the anti-theft warning apparatus will be described below:

A) The disarmed processing (anti-theft warning control function released state):

The disarmed processing is in the state wherein the control function of the anti-theft warning apparatus is not effectively operated (in the released state) since the user is assumed to be present within the vehicle passenger compartment or present at a place outside of the vehicle surrounding the vehicle passenger compartment according to the result of the vehicle drive by the user or the result of the trunk open or the result of any door open. In this state, the alarm relay indicator is in OFF state (Alarm Relay Indicator=OFF). It is noted that the CPU 6C determines that the control in the anti-theft warning apparatus is in the disarmed processing state when detecting that both of an indicator output signal and the alarm indicator are in the off states;.

Figure 6B:
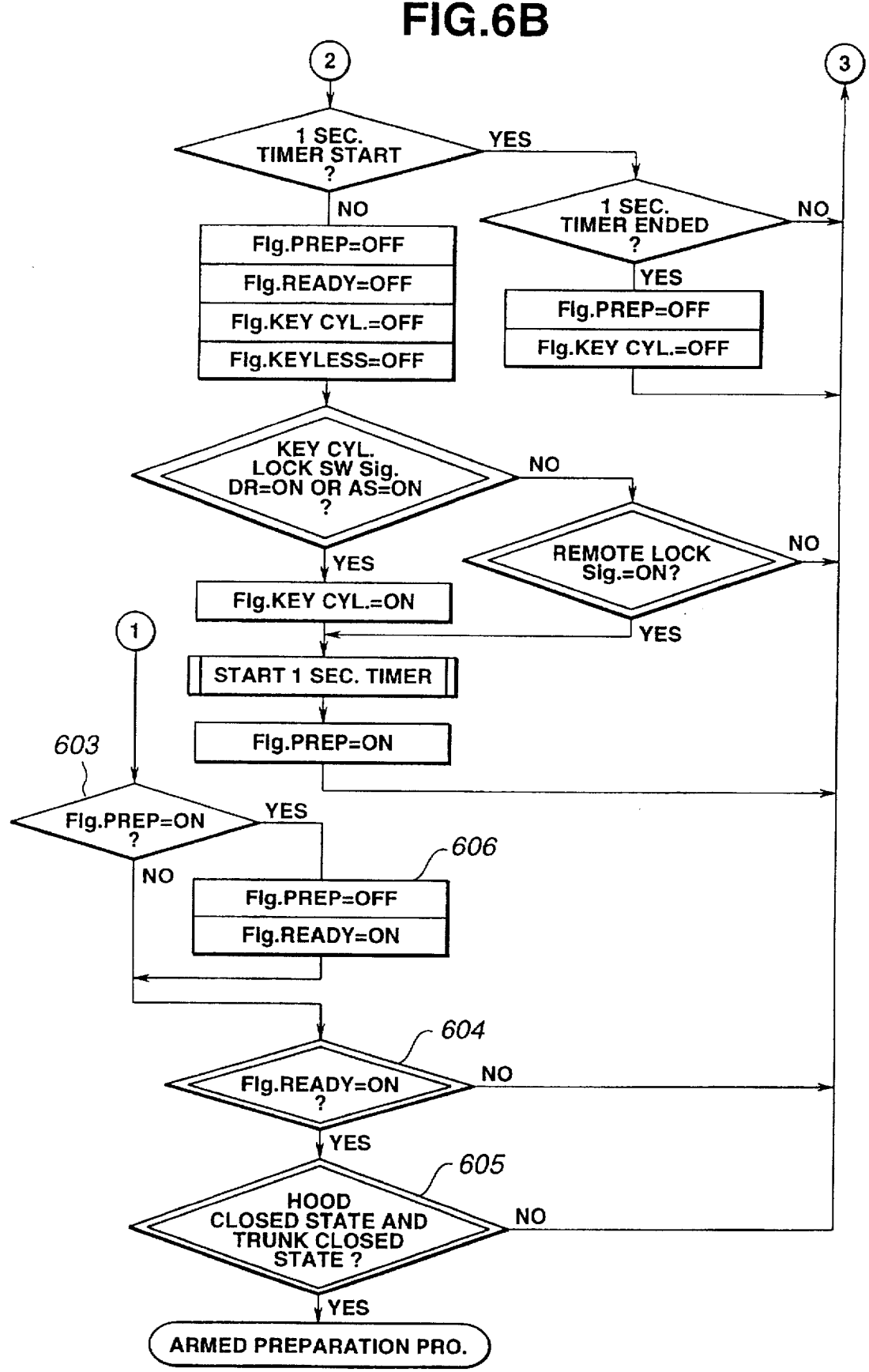

FIGS. 6A and 6B integrally show an example of the flowchart of the control of the anti-theft warning apparatus in the disarmed processing executed by the CPU 6C.

In FIGS. 6A and 6B (FIGS. 7A through 9C inclusive), ACC=OFF means that a vehicular accessory switch (ACC) is turned off, IGN=OFF means that the ignition key is not inserted into the key cylinder of the ignition key, "all doors are closed" means that DOOR SW DR (door switch at the door located adjacent to the driver's seat)=OFF, AS (door switch at the door located adjacent to the assistant passenger seat) OFF, RR (the door at the rear right passenger seat)= OFF, and RL (the door at the rear left passenger seat)=OFF, "all doors are locked" means that DOOR LOCKED SW DR=OFF, AS=OFF, RR=OFF, and RL=OFF, "the door adjacent to the driver's seat is locked" means that DOOR LOCKED STATE SW DR=OFF, "hood is closed and the trunk is closed" means that HOOD SW=OFF and TRUNK SW=OFF, KEY CYL. LOCK SW sig. DR=ON or AS=ON means that the key cylinder lock signal DR=ON or AS=ON, KEY CYL. UNLOCK SW sig. DR=ON or AS=ON means that the key cylinder unlock signal DR=ON or AS=ON, KEY CYL. TRUNK SW=ON means that the trunk (unlatch) SW signal ON=REMOTE LOCK sig.=ON means that the lock request signal from the remote controller 10 can be accepted, REMOTE UNLOCK sig.=ON means that the unlock request from the remote controller 10 can be accepted, and REMOTE TRUNK sig.=ON means that the trunk (unlatch) request signal from the remote controller 10 can be accepted, ARMED STATE means that the armed processing state (the alarm processing state is inclusive) is carried out (ARMED STATE=SET) (this flag is nonvolatile), Flg. KEYLESS means that the execution or non-execution of Flg. KEYLESS of the door lock from the keyless entry system, Flg. KEY. CYL means the execution or non-execution of the key cylinder lock, Flg. PREP means that the lock end wait state from the remote controller 10 or from the key cylinder, Flg. READY means that the established state (ON/OFF) of the alarm preparation transfer condition except the hood switch and the trunk switch, Flg. ALARM means that the necessity of the alarm development, Flg. LOCK means that the presence or absence of the alarm development due to the fact that all of the doors are not locked, Flg. HOOD means that the presence or absence of the alarm development due to the fact that the hood is not closed, Flg. TRUNK means that the presence or absence of the alarm development due to the fact that the trunk is not closed, and Flg. DOOR means that the presence or absence of the alarm development due to the fact that all of the doors are not closed. In addition, 1 Sec. timer functions as a timer waiting for the establishment of locked states of all doors from the input of the key cylinder or keyless remote controller inputted lock signal during the disarmed processing state, 30 Sec. timer functions as a timer effective for 30 seconds during the armed preparation processing state, 150 Sec. timer functions as a timer effective for the alarm relay outputting time. 0.5 Sec. timer functions as a timer waiting for a key cylinder or keyless remote controller inputted lock signal before the control transfer establishment that all doors are locked during the armed processing, 0.5 Sec. timer (1) functions as a timer waiting for an input of the key cylinder or keyless remote controlled inputted lock signal before the transfer to the alarm processing state upon the establishment of all doors locked state during the armed processing, 0.5 Sec timer (2) functions as a timer waiting for the establishment such that all doors are not locked upon the input of the key cylinder unlock signal or remote controller inputted unlock signal during the armed processing state, 0.5 See. timer (3) functions as a timer waiting for the input of the key cylinder open signal or remote controller inputted open signal input before the transfer of the control to the armed processing state upon the establishment such that neither the hood switch is closed nor the trunk is closed during the armed processing state, 0.5 Sec. timer (4) functions as a timer waiting for the establishment such that neither the hood switch nor trunk switch is closed in response to the key cylinder open signal or remote controller inputted open signal, and 0.5 Sec. timer (5) functions as a timer for delaying the transfer to the alarm processing when all doors are not closed during the armed processing.

Referring FIGS. 6A and 6B, the disarmed processing is executed, for example, in the following way.

At s step 600, the CPU 6C determines whether the ACC=OFF and IGN=OFF. If ACC=OFF and IGN=OFF (Yes) at the step 600, the routine goes to a step 602 in which the CPU 6C determines whether all of the vehicle doors are closed. If all of the vehicle doors are closed (Yes) at the step 601, the routine goes to a step 602 in which the CPU 6C determines whether all doors are locked.

If the CPU 6C determines that all doors are locked (Yes) at the step 602, the routine goes to a step 603 in which the flag state of Flg. PREP is in the on state. The flag Flg. PREP indicated that the CPU 6C is waiting for the completion of the locks for the doors through the key cylinder thereof and the keyless input code inputted from the remote controller 10.

Then, the routine goes to a step 606 in which Flg. PREP is set to zero (OFF) and the Flg.READY is set to on (ON).

If Flg.PREP is set to OFF at the step 603, the routine directly goes to a step 604. In addition, if Flg.PREP is set to ON (Yes) at the step 603, the routine goes to the step 604 via the step 606.

At the step 604, the CPU 6C determines whether the Flg.READY is in the on state.

If the flag of Flg.READY is in the on state (Yes) at the step 604, the routine goes to a step 605 in which the CPU 6C determines whether the hood switch is closed and the trunk is closed.

If both of the hood switch and the trunk are closed (Yes) at the step 605, the routine goes to the armed preparation processing state.

The flag of Flg.READY means that the CPU 6C needs to wait the completion of the locks of the doors.

As described above, the disarmed processing is executed. It is noted that the CPU 6C determines whether the present time falls within the disarmed processing state depending on whether the alarm relay or indicator is in the off state.

B) The armed preparation processing is in the intermediate state transferred from the disarmed processing to the armed processing states and in the state wherein the user himself does not want to receive the alarm as an intruder.

i.e., a preparation for the setting of the anti-theft warning function (armed processing) is carried out. It is noted that the CPU 6C determines that the control in the anti-theft warning apparatus is in the armed preparation processing state when detecting that the indicator output signal is in the on state and that the alarm relay output signal is in the off state. The armed preparation processing term is 30 seconds.

Figure 7A:
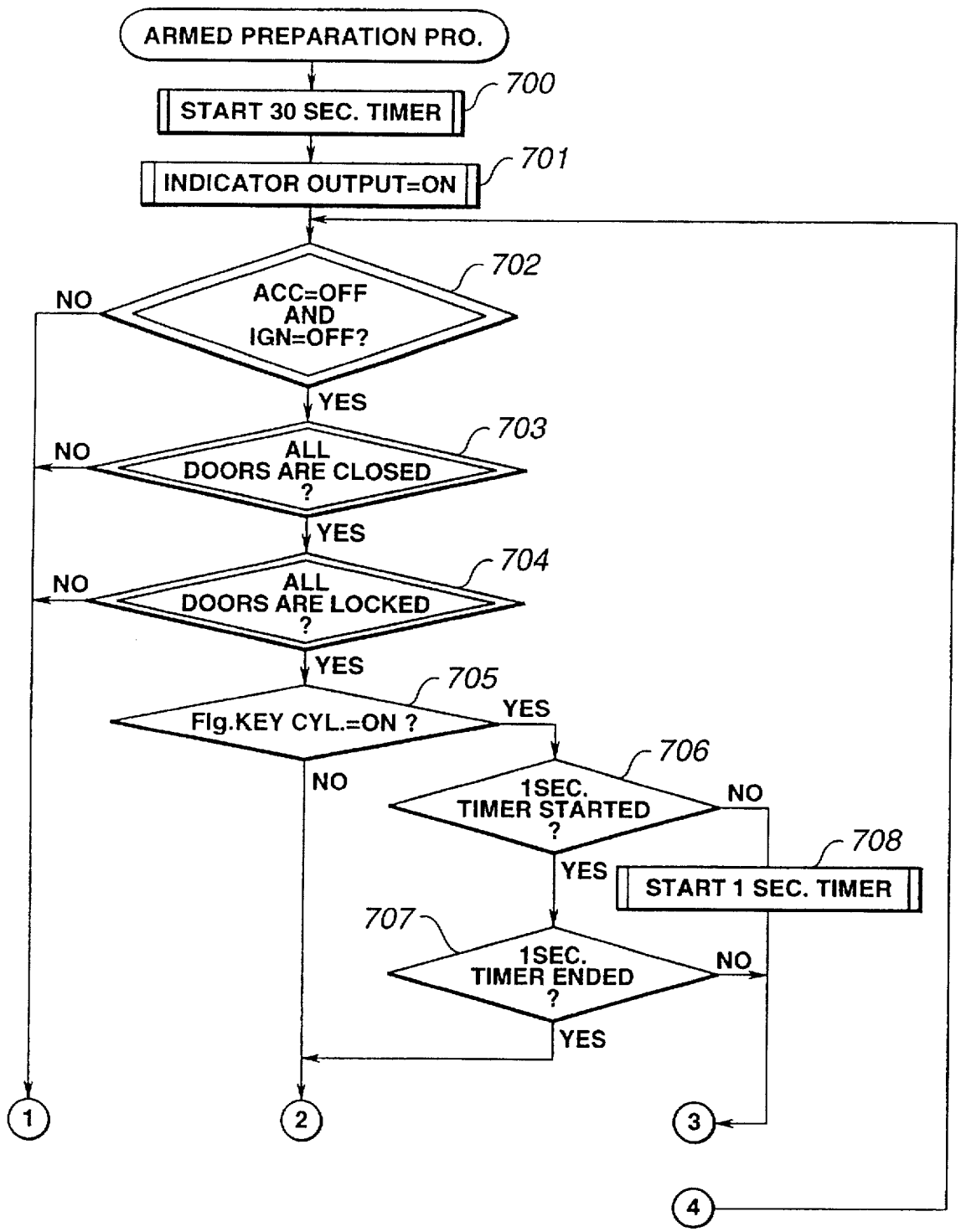
FIGS. 7A and 7B are integrally a flowchart for explaining an armed preparation processing state in the operation of the anti-theft warning apparatus shown in FIG. 1.
Figure 7B:
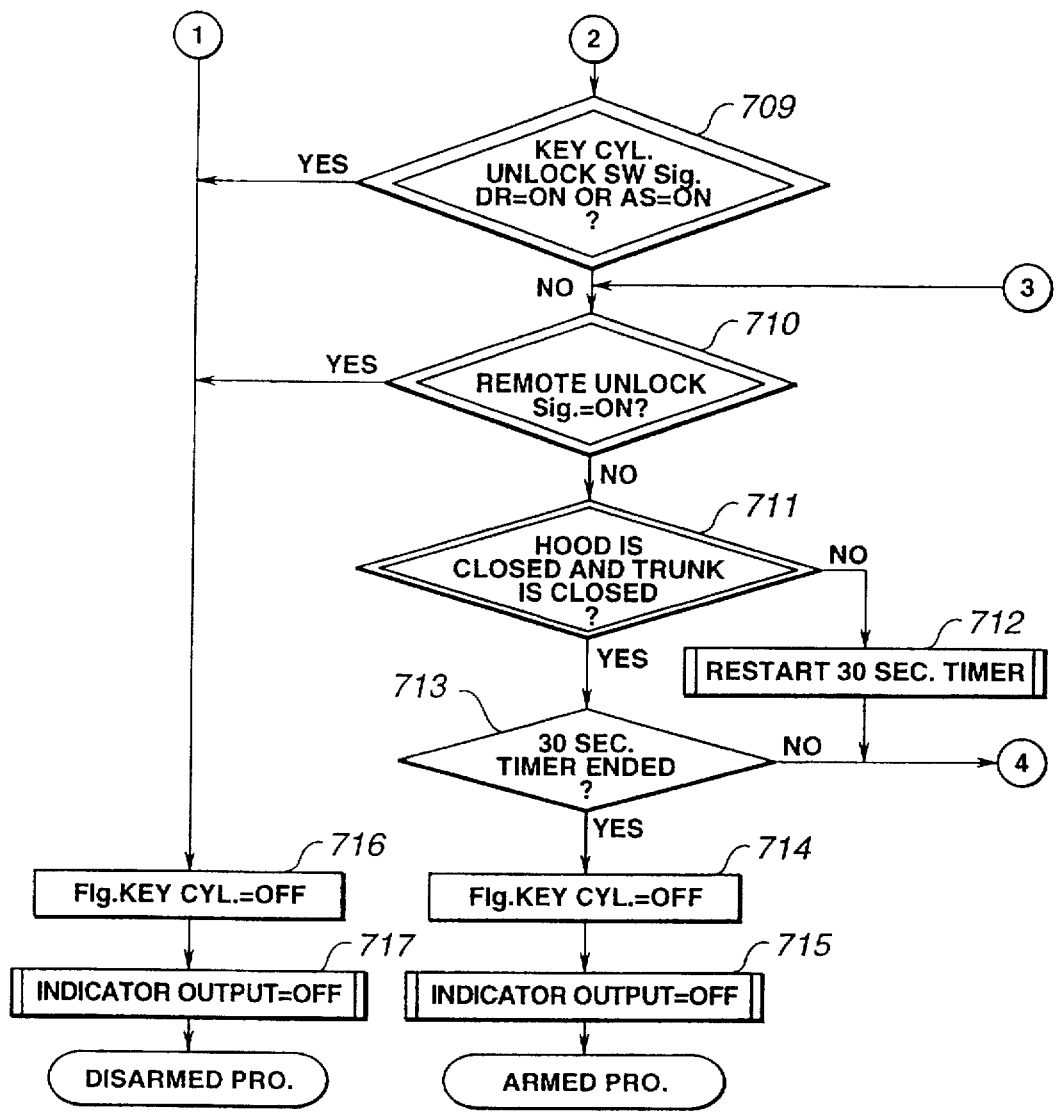

FIGS. 7A and 7B integrally show an example of the armed preparation processing flowchart in the anti-theft warning apparatus.

At the first step 700, the CPU 60 starts 30 second timer and the CPU 6C sets the indicator output to ON at a step 701.

At a step 702, the CPU 6C determines whether ACC=OFF and IGN=OFF is established.

If Yes at the step 702, the routine goes to a step 703 to determine whether all doors are closed. If the CPU 6C determines that all doors are closed at the step 703, the routine goes to a step 704 to determine whether all doors are locked.

If all doors are locked (Yes) at the step 704, the routine goes to a step 705 in which the CPU 6C determines whether all doors are closed.

If Yes at the step 704, the routine goes to a step 705 in which the CPU 6C determines whether Flg. KEY.CYL is set to OFF.

If the flag of Flg.KEY.CYL is set to OFF, the routine goes to a step 709. If the flag of Flg.KEY.CYL is set to on, the processing with one second timer is started at steps 706, 707., and 708.

At the step 709, the CPU determines whether KEY CYL UNLOCK SW signal DR=ON or AS=ON.

If the CPU determines that KEY.CYL UNLOCK SW signal DR=ON or AS=ON at the step 709, the routine goes to a step 710.

At the step 710, the CPU 6C determines whether remote unlock signal is turned on.

If the CPU 6C determines that the remote unlock signal is turned on (Yes) at the step 710.

Then, the routine goes to a step 711 in which the CPU 6C determines whether the hood is closed and the trunk is closed. The closure of the trunk means the latched state of the trunk.

If the CPU 6C determines that the hood switch and the trunk are closed (Yes) at the step 711, the routine goes to a step 713 to confirm whether the first set time at the step 700 becomes the time set as the 30 sec. timer.

If the time of 30 seconds have passed, the so routine goes to a step 714 wherein Flg.KEY CYL is set to OFF and the indicator is turned off.

If No at the steps 702, 703, 704 and Yes at the step 709 and 710, the routine goes to a step 716 in which Flg.KEY CYL is set to OFF and at a step 717 in which the CPU 6C sets the indicator output is OFF.

If the CPU 6C checked to see whether the anti-theft warning control enters the transfer processing modes of, e.g., the armed processing from the mischief preventive (anti-theft warning) indicator.

As shown in FIG. 7A arid 7B, such that the indicator output is turned on and the alarm relay output is turned off indicates that the control of the anti-theft warning apparatus is entered into the armed preparation processing step.

C) The armed processing (the anti-theft warning function is set):

At this state, the anti-theft warning function is set in a preliminary alert. (In the anti-theft warning function, the mischief preventive (anti-theft warning) indicator is blinked). The CPU 6C determines that the control in the anti-theft warning apparatus is in the armed processing state when detecting that the indicator output signal is in the off state, the alarm relay output signal is in the off state, an anti-warning (mischief preventive) is in a blink mode, but the flag of ARMED STATE is set.

The armed processing is the state wherein the CPU 6C determines whether the locked state of any door is transferred to the unlocked state independently of any key operation (the key operation includes a door key cylinder lock/unlock (DR (driver's seat positioned door), AS (assistant (passenger's) seat positioned door) using a key, the control of a trunk key cylinder unlatch control using the key, and the door lock and door unlock control using the keyless input code transmitter (remote controller 10) or according to an on state of any lid (the lid indicates door SW (DR (Driver's seat positioned door), AS, RR (Rear Right positioned door), and RL (Rear Left positioned door), the hood switch Ho SW, and trunk switch Tr SW). Any lid turned on state means any one or more of the doors (DR, AS, RR, and RL), engine hood, or trunk are in the open states.

If the locked state of any door is transferred to the unlocked state independently of any key operation and independently of the open state of any lid, the CPU 6C in the armed processing state is transferred to the alarm processing state.

Figure 8A:
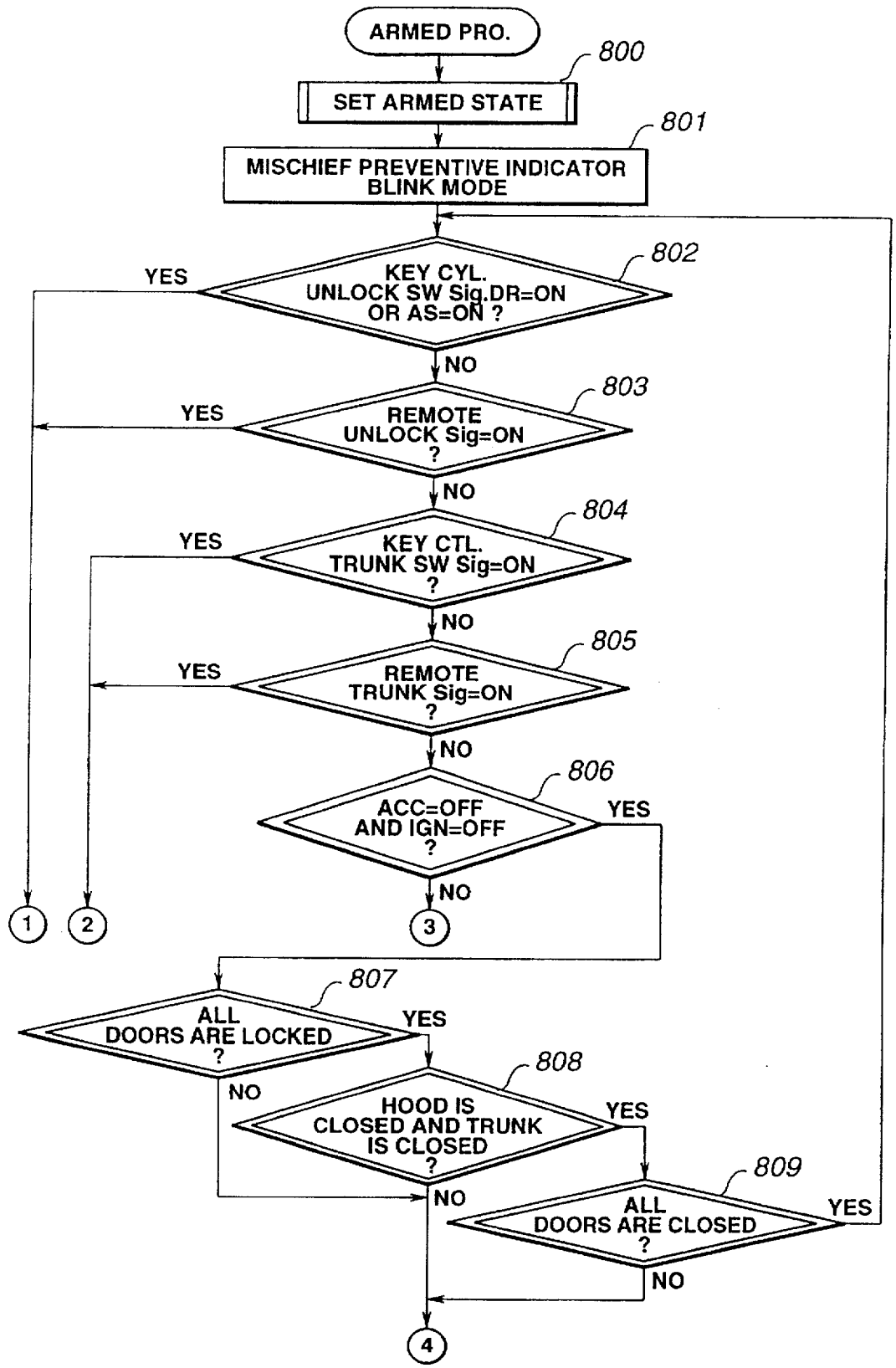
FIGS. 8A, 8B, and 8C are integrally a flowchart for explaining an armed processing state in the operation of the anti-theft warning apparatus shown in FIG. 1.
Figure 8B:
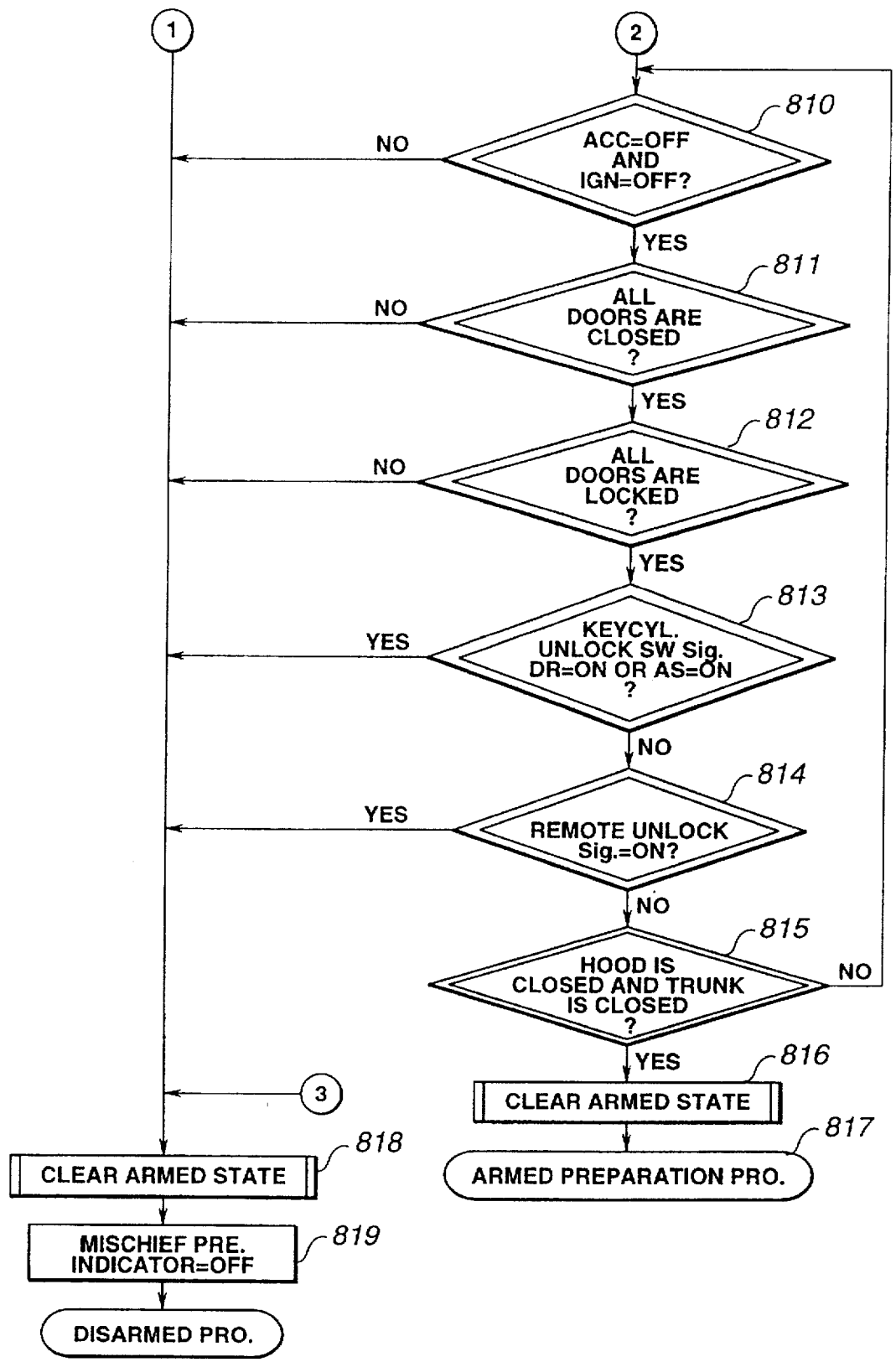
Figure 8C:
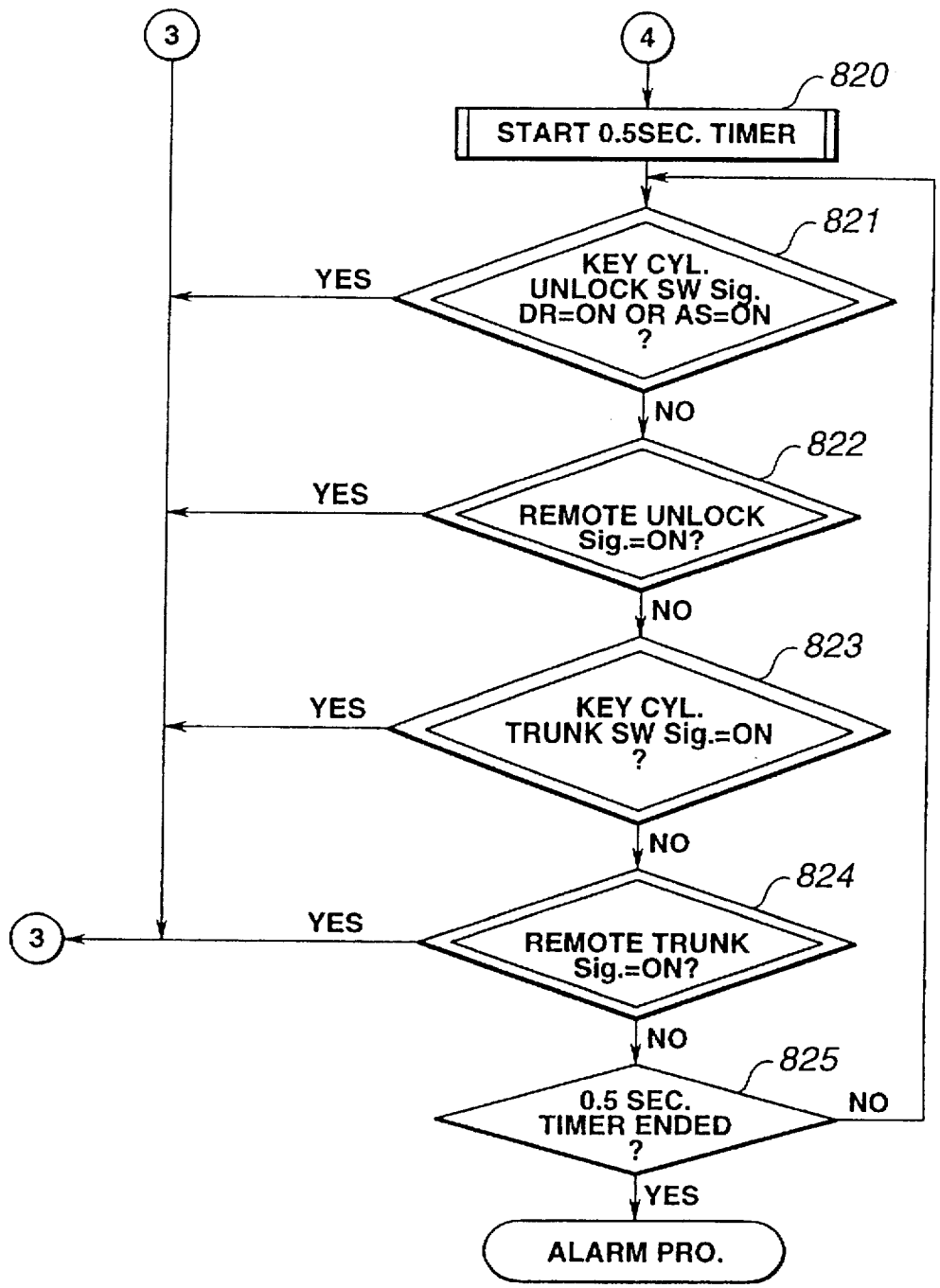

FIGS. 8A, 8B, and 8C integrally show the armed processing flowchart executed in the CPU 6C.

As shown in FIG. 8A, when the control of the anti-theft warning apparatus enters the armed processing state, the flag of "ARMED STATE" is set at a step 800 to indicate that the control mode in the anti-theft warning apparatus is entered into the armed processing state.

At the next step 801, the mischief preventive indicator (anti-theft warning) indicator is in a blink mode.

At the next step 802, the CPU 6C determines whether KEY CYL UNLOCK SW Sig.DR=ON or AS=ON or not.

If Yes at the step 802, the routine goes to a step 818 in which the flag of ARMED STATE is cleared. At the next step, the (mischief preventive) anti-theft warning indicator is turned off and the routine is transferred to the disarmed processing state.

If No at the step 802, the routine goes to a step 803 in which the CPU 6C determines whether REMOTE UNLOCK Sig=ON.

If Yes at the step 803, the routine goes to a step 818.

If No at the step 803, the routine goes to a step 804 in which the CPU 6C determines whether KEY CYL TRUNK SW Sig=ON.

If Yes at the step 804, the routine goes to a step 810. If No at the step 804, the routine goes to a step 805. At the step 805, the CPU 6C determines whether REMOTE TRUNK Sig=ON. If Yes at the step 805, the routine goes to the step 810. If No at the step 805, the routine goes to a step 806 in which the CPU determines whether ACC=OFF and IGN=OFF.

If Yes at the step 806, the routine goes to a step 807 in which the CPU 6C determines whether all doors are locked.

At the step 807, the CPU 6C determines whether all doors are locked.

If Yes at the step 807, the routine goes to a step 808. If No at the step 807, the routine goes to a step 820. At the step 808, the CPU 6C determines whether hood is closed and the trunk is closed. If Yes at the step 808, the routine goes to a step 809. If No at the step 808, the routine goes to the step 820. At the step 809, the CPU 6C determines whether all doors are closed. If Yes at the step 809, the routine goes to the step 802. If No at the step 809, the routine goes to the step 820. If No at the step 806, the routine goes to the step 818. If No at the step 810, No at the step 811, and No at the step 812, the routine goes to the step 818. If Yes at steps 813 and 814, the routine goes to the step 818. If Yes at a step 815, the routine goes to a step 816 in which the ARMED STATE is cleared and the routine is transferred to the armed preparation processing state.

At the step 820, the CPU 6C starts 0.5 sec. timer. If Yes at steps 821, 822, 823, and 824, the routine goes to the step 818. At a step 825, if 0.5 sec. timer is ended (yes), the routine is transferred to the alarm processing state. The other explanations of the steps in FIGS. 8A through 8C are omitted herein.

D) The alarm processing:

During the alarm processing, the alarm relay ALM in FIG. 1 is executed to be in the on state for two minutes and 30 seconds (150 seconds). After the alarm processing is ended, the set state of the anti-theft warning control is continued but its alarm development condition is different from the armed processing.

Figure 9A:
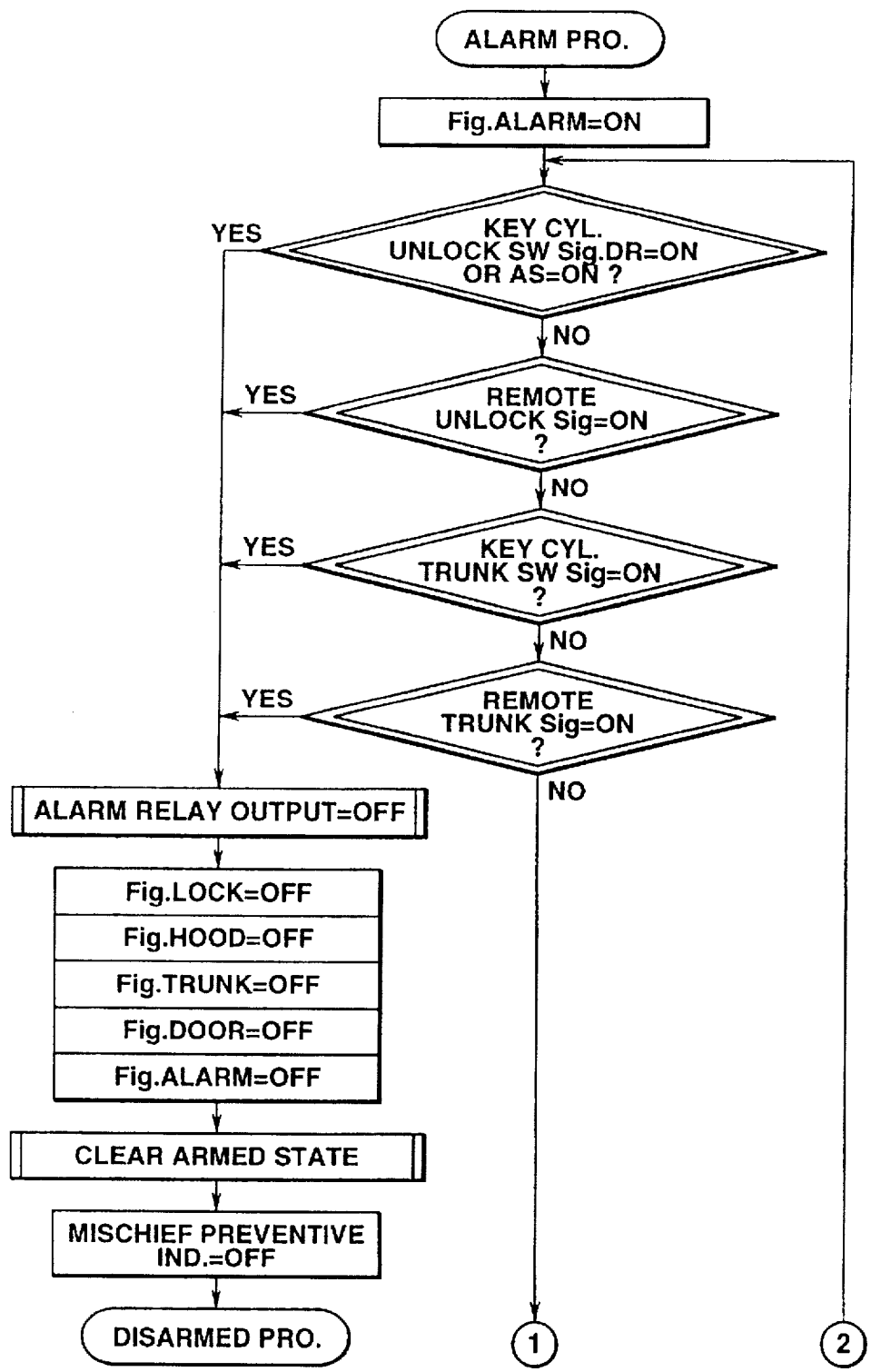
FIGS. 9A, 9B, and 9C are integrally a flowchart for explaining the alarm processing state in the operation of the anti-theft warning apparatus shown in FIG. 1.
Figure 9B:
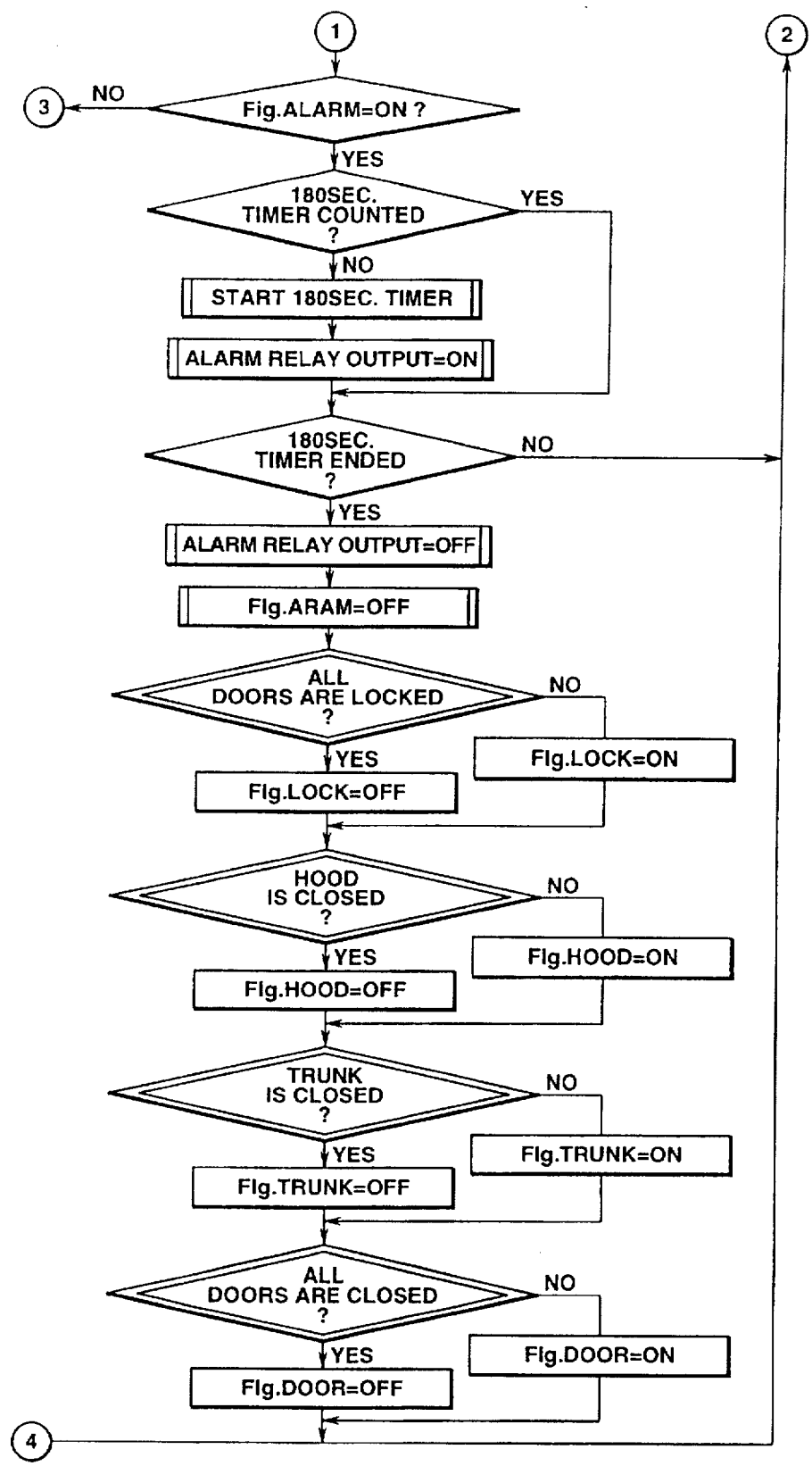
Figure 9C:
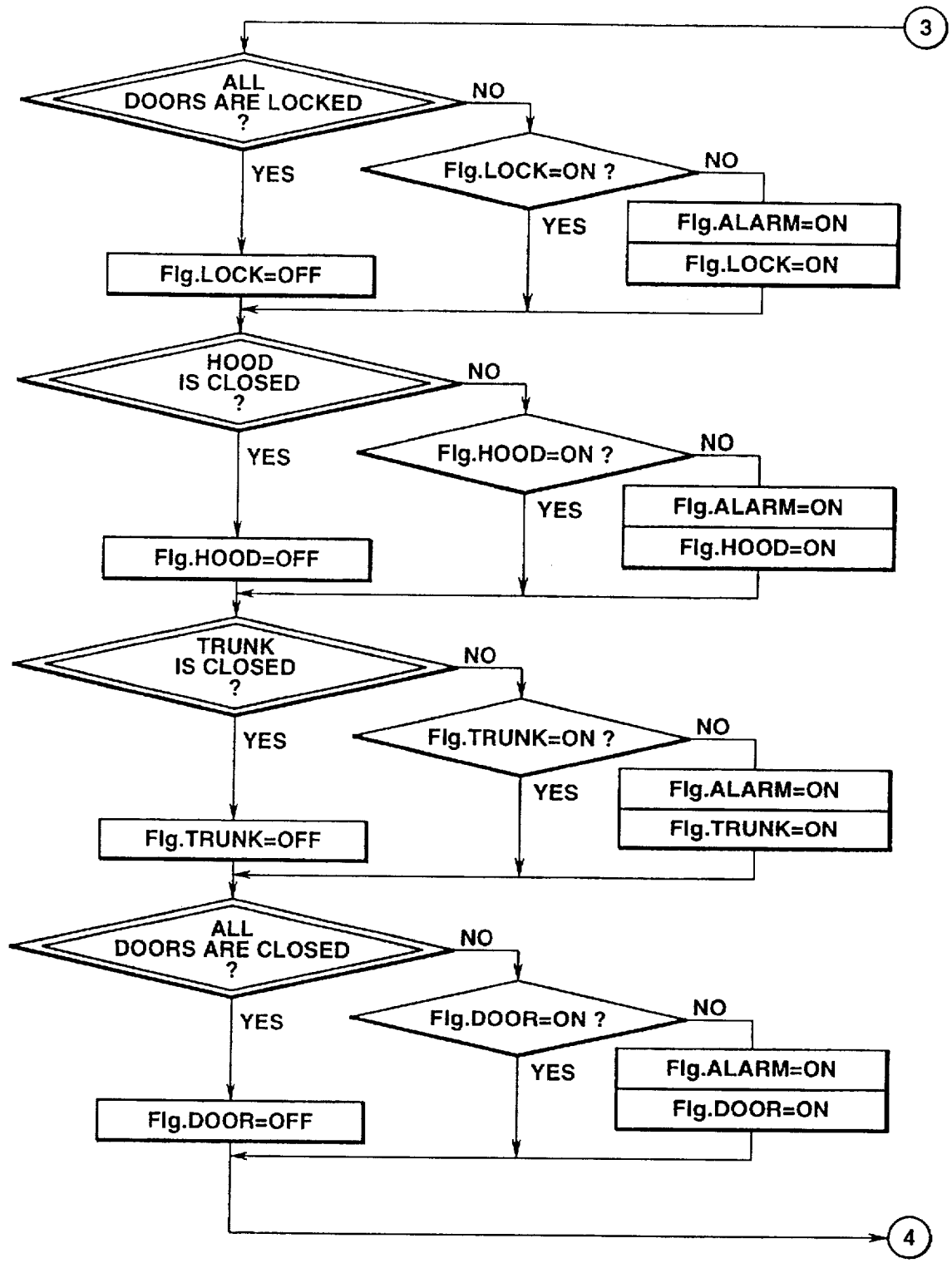

FIGS. 9A, 9B, and 9C integrally show the alarm processing flowchart executed in the anti-theft warning apparatus of the CPU 6C. The detailed explanation of FIGS. 9A, 9B, and 9C will be omitted herein.

When the power supply is turned on (the anti-theft warning apparatus Is activated), the CPU 6C is transferred into the alarm processing if a flag of ARMED STATE is set (in a case wherein the armed processing or the alarm processing is carried out). If ARMED STATE is not set (No), the anti-theft warning control mode is transferred to the disarmed processing.

(A) The details of the content of the disarmed processing will be described later:

The CPU CC can recognize that the (mischief preventive) anti-theft warning control is in the disarmed processing state (in the anti-theft warning function released state) according to the output (OFF) states of both the warning indicator and the alarm relay output.

a) If the keyless input code door look (at first, any door is open, thereafter, all doors are unlocked and locked, and, finally, all doors are closed) is carried out, as a consequence, all doors are in the locked conditions with ACC=OFF and IGN=OFF.

b) In a case where all doors are locked using the remote controller 10 of the keyless entry system (confirming that the door locked conditions are established within one second according to the lock request from the remote controller 10 with all of the door closed).

c) A case where all of the doors are locked within one second from the key cylinder lock signal (DR, AS) according to the key cylinder lock signal (with all of the doors closed, the door locked state is established within one second according to the lock request).

When no change occurs in the all of doors lock state or door open/closure states after either of the conditions of a), b), or c) described above is established, the control mode enters from the disarmed processing state to the armed preparation processing state at a time when the hood switch (Ho SW) is closed and the trunk switch (Tr SW) is closed without transfer of the other processing modes.

(B) The details of the armed preparation processing (a state wherein the preparation of the anti-theft warning function is carried out) will be described below:

When the armed preparation processing is carried out, it is indicated by (warning indicator output =ON, alarm relay output=OFF). 1) The conditions of the control mode transfer 1 (to the armed processing):

1-a ) For 30 seconds upon, the start of the armed preparation processing, conditions such that ACC=OFF, IGN=OFF, all doors are closed, and all doors are locked are established, the time duration under such conditions that the hood switch (Ho SW) is closed and the trunk switch (Tr SW) is closed is elapsed without the input of the key cylinder unlock signals (DR, AS) and with an absence of the unlock request in the keyless entry system from the remote controller 10.

1-b) During the armed preparation processing, with ACC=OFF and IGN=OFF, such conditions that all doors are closed and all doors are locked are established. 30 seconds have passed from the time when either or both of the hood switch and the trunk switch is closed are established without input of the key cylinder unlock signal (DR, AS) and the unlock request from the keyless entry system.

If either of 1-a) or 1-b) described above is established, the control mode is transferred from the armed preparation processing state to the armed state.

It is noted that if the transfer trigger from the disarmed processing to the armed preparation processing is caused by the key cylinder lock signal (DR, AS), the input of the key cylinder unlock signal (DR, AS) is neglected for one second from the time of the transfer of control to the armed preparation processing state. 2) Mode transfer condition 2 (to the disarmed processing), When the armed processing transfer condition described in 1-a) and 1-b) is not established, the control mode is transferred immediately from the armed preparation processing state into the disarmed processing state.

(C) The details of the armed processing (the anti-theft warning function set state) will be described below:

When the armed processing is carried out, it is indicated by the indicator output=blink and alarm relay output=OFF.

a) The condition to transfer the control mode to the alarm processing; from the armed processing state:

With ACC=OFF and IGN=OFF, when such conditions that no key cylinder unlock signal (DR, AS) is present, no unlock request from the remote controller 10 of the keyless entry system is present, no key cylinder trunk signal is present, and no trunk (unlatch) request from the keyless entry system is present are established, the processing is transferred from the armed processing into the alarm processing it a) a case occurs where all doors are not locked, b) a case occurs where neither the hood switch Ho SW is closed nor the trunk switch Tr SW is closed; and c) a case occurs where all of the doors are closed, and if the generations of a), b) and c) are triggered, without the key cylinder unlock signal (DR, AS) present within 0.5 seconds, without the unlock request from the remote controller 10, without no key cylinder trunk signal, and without no request of the keyless entry system on the trunk.

b) The condition to transfer the control mode 2 (to the armed preparation processing):

In a case wherein with ACC=OFF and IGN=OFF, no key cylinder unlock signal (DR, AS) is present, the unlock request from the remote controller 10 is not present, where either or both of the hood switch or trunk switch is opened after the trunk request from the keyless entry system is issued with all doors closed and with all doors locked, the control mode is transferred from the armed processing state to the armed preparation processing state.

13 c) The condition to transfer the control mode 3 (to the disarmed processing state):

c-1) The condition of the transfer mode from the armed processing to the disarmed processing is such that ACC=ON or IGN=ON.

c-2) If the key cylinder unlock signal (DR, AS) or the unlock (unlatch) request is present from the remote controller 10, the control mode is transferred from the armed processing to the disarmed processing state.

c-3) The routine is transferred from the armed processing to the disarmed processing state if, with ACC =OFF and IGN=OFF, the CPU 6C recognizes that ① ACC= ON or IGN=ON, ② key cylinder unlock signal (DR, AS) is present, ③ unlock request from the remote controller 10 of the key less entry system, ④ any door is open, ⑤ any door is unlocked before either of the hood switch or trunk switch is open after the trunk request from the keyless entry system or from the key cylinder trunk signal is issued with all doors closed and all doors locked without the key cylinder unlock signal (DR, AS) and without the unlock request from the remote controller 10.

c-4) With ACC=OFF and IGN=OFF, with no key cylinder unlock signal (DR, AS) present, with no unlock request from the remote controller 10, with no key cylinder trunk signal, and with no trunk request for the keyless entry system, the following conditions are established; e) a case where all of the doors are not locked; f) a case where the hood switch is not closed and the trunk switch is not closed; and g) a case where all doors are not closed. Upon the trigger by the above-described conditions e), f), and g) either of the key cylinder unlock signal (DR, AS), the unlock request for the remote controller 10, the key cylinder trunk signal, or the trunk (unlatch or latch) request for the keyless entry system is present.

When either of the conditions of c-1, c-2, c-3, and c-4 is established, the control mode is transferred to the disarmed processing state.

Figure 4:
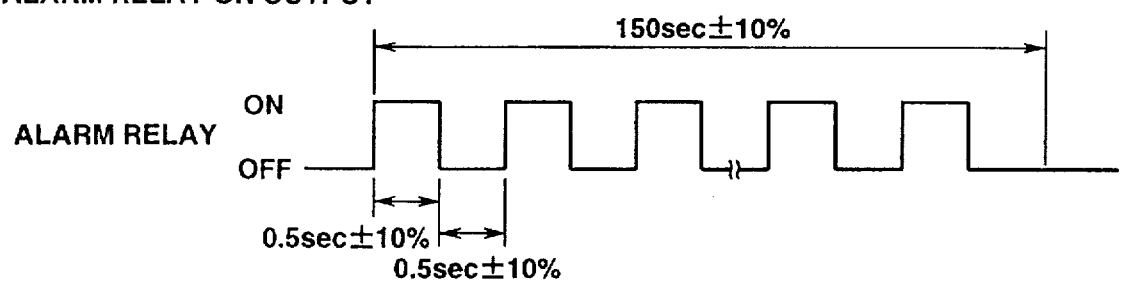
FIG. 4 is a signal timing chart of an alarm relay output signal for explaining an alarm processing state in an operation of the anti-theft warning apparatus shown in FIG. 1.

(D) The alarm processing:

Indicator output is off and the alarm relay output is such as shown in FIG. 4, and is continued for 150 seconds in the case of the alarm processing.

During the alarm relay output ON, in a case where the outputs of the key cylinder unlock signal (DR, AS), of the unlock request from the remote controller 10, of the key cylinder trunk signal, or of the trunk request for the remote controller 10 are present, the outputs of the alarm relay signals are halted.

If either of four status groups which are causes of the alarm development during the alarm processing (with the alarm relay output OFF) (all doors are locked, the hood switch is open or closed, the trunk switch is open or closed, all doors are open or closed) are status changed into (from the state where all of the doors are locked to the state where all doors are unlocked, from the state where the hood switch is closed to the state where the hood switch is open, from the state where the trunk switch is closed to the state where the trunk switch is open, the alarm relay output shown in FIG. 4 is developed to alarm the user of the invasion of a theft into the passenger compartment.

However, if either of the key cylinder (door) unlock signal (DR, AS) or the (door) unlock request from the remote controller 10 is present, the key cylinder trunk signal, or the trunk (unlatch) request for the remote controller 10 is present, the output of the alarm relay signal is stopped.

The condition to transfer the control mode from the alarm processing into the disarmed processing:

14

The control mode of the anti-theft warning apparatus is immediately transferred to the disarmed state during the alarm processing, when any of the key cylinder unlock signal (DR, AS), the unlock request for the remote controller 10, the key cylinder trunk signal, or the trunk unlatch request for the remote controller 10 is issued.

(E) It is noted that even if the power supply of the receiver 6 is interrupted, the content of the operation before the system power supply is turned off is held (in a case where the armed processing or alarm processing is carried out, "ARMED STATE" is in the set state).

It is noted that double triangular marked determination steps in FIGS. 6A through 9C denote readings and determinations from external status to the controller (receiver) 6.

What is claimed is:

1. An anti-theft warning apparatus in a vehicle including a vehicular trunk unlatching device, said vehicular trunk unlatching device comprising:

a trunk opener switch; and a trunk unlatching actuator associated with said trunk opener switch so as to be actuated into an unlocking position of a vehicular trunk in response to an activation of the trunk opener switch;

said anti-theft warning apparatus comprising:

a first canceling circuit activated to make the activation of said trunk opener switch ineffective so as to prevent the trunk unlatching actuator from being actuated into the unlatching position;

a first detector arranged for detecting whether an anti-theft warning function in the anti-theft warning apparatus is set;

a drive circuit activated to make the activation of said trunk opener switch ineffective; and a second canceling circuit activated to make the activation of said trunk opener switch ineffective via said drive circuit so as to prevent the trunk unlatching actuator from being actuated into the unlatching position when said first detector detects that the anti-theft warning function is set.

2. An anti-theft warning apparatus as claimed in claim 1, wherein said first detector detects whether the anti-theft warning function is set based on whether a flag indicating an armed state is set.

3. An anti-theft warning apparatus as claimed in claim 2, wherein said flag is set when said anti-theft warning function is in an armed processing state.

4. An anti-theft warning apparatus as claimed in claim 1, further comprising a second detector arranged for detecting whether the anti-theft warning function presently enters a disarmed processing state and wherein said second canceling circuit is activated so as to make the activation of said trunk opener switch effective for said trunk unlatching actuator to be actuated into the unlatching position when the anti-theft warning function presently enters the disarmed processing state.

5. An anti-theft warning apparatus as claimed in claim 4, further comprising a third detector arranged for detecting whether the anti-theft warning function presently enters an armed preparation processing state and wherein said second canceling circuit is activated so as to make the activation of said trunk opener switch effective when said third detector detects that the anti-theft warning function presently enters the armed preparation processing state.

6. An anti-theft warning apparatus as claimed in claim 3, wherein said armed processing state includes an alarm processing state in which an alarm relay is activated for a predetermined time, and wherein said flag is set when the anti-theft warning function is in the alarm processing state.

7. An anti-theft warning apparatus as claimed in claim 1, further comprising a vehicular ignition key cylinder insertion sensor arranged for detecting whether an ignition key is inserted into an ignition key cylinder and for outputting a detection signal when detecting that the ignition key is inserted thereinto and wherein said drive circuit is de-activated so as to make the activations of both of said trunk opener switch and said first canceling circuit effective in response to the detection signal of said ignition key cylinder insertion sensor.

8. An anti-theft warning apparatus as claimed in claim 1, further comprising a vehicular accessory switch which is activated when a vehicular accessory associated with the vehicular accessory switch is activated and wherein said drive circuit is de-activated so as to make the activations of both of said trunk opener switch and said first canceling circuit effective when said vehicular accessory switch is turned on.

9. An anti-theft warning apparatus as claimed in claim 1, wherein said anti-theft warning apparatus is incorporated into a keyless entry system and said anti-theft warning function is set on the basis of door locking operations for the vehicular doors in response to an input of a keyless input code corresponding to a request for the vehicular doors to be locked.

10. An anti-theft warning apparatus as claimed in claim 1, wherein said anti-theft warning function is set on the basis of door locking operations without use of a door key by a user of the vehicle.

11. An anti-theft warning apparatus as claimed in claim 9, further comprising a second detector arranged for detecting whether any door is open and wherein said anti-theft warning function is set on the basis of the detection by the second detector that any door is open.

12. An anti-theft warning apparatus as claimed in claim 9, wherein the anti-theft warning function is set when neither a door unlocking operation nor a trunk unlatching operation is carried out for a predetermined period of time upon an end of the door locking operations through the keyless entry system.

13. An anti-theft warning apparatus as claimed in claim 6, wherein said predetermined time is approximately 30 seconds.

14. An anti-theft warning apparatus as claimed in clam 12, wherein said predetermined period of time is approximately 150 seconds.

15. An anti-theft warning apparatus as claimed in claim 1, wherein said drive circuit and said second canceling circuit are located within an area of a passenger compartment of the vehicle which is not readily accessible.

16. A method for carrying out an anti-theft warning function in conjunction with a vehicular trunk unlatching device, in a vehicle with a keyless entry system having an anti-theft warning apparatus, said vehicular trunk unlatching device comprising: a trunk opener switch; a trunk unlatching actuator associated with said trunk opener switch so as to be actuated into an unlatching position of a vehicular trunk in response to an activation of a manually operable switch; and said anti-theft warning apparatus having a canceling circuit, an accessible part of said canceling circuit being installed within a lockable glove box in a vehicle passenger compartment so as to enable an activation of said canceling circuit when the lockable glove box is open, said canceling circuit being turned off so as to make the activation of said trunk opener switch ineffective to prevent the trunk unlatching actuator from being actuated into the unlatching position and being turned on so as to make the operation of said trunk opener switch effective, and a drive circuit interposed between said trunk opener switch and said canceling circuit, said method comprising the steps of:

detecting whether the anti-theft warning function is set;

turning off the drive circuit so as to make the activation of said trunk opener switch ineffective when detecting that the anti-theft warning function is set.

17. A method as claimed in claim 16, wherein an inaccessible part of said canceling circuit is installed within an area of the vehicle passenger compartment which is not readily accessible.

18. A method for controlling operation of a trunk unlatching device, in a vehicle having an anti-theft warning system and a trunk opener switch in a passenger compartment of said vehicle for causing said trunk unlatching device to unlatch, said method comprising the steps of:

(A) detecting whether said anti-theft warning system is armed or disarmed; and (B) configuring said trunk unlatching device to be unresponsive to said trunk opener switch in said passenger compartment when said anti-theft warning system is detected to be armed in step (A).

19. A trunk unlatching device, in a vehicle having a trunk and an anti-theft warning system, said trunk unlatching device comprising:

a trunk opener switch located in a passenger compartment of said vehicle;

a trunk unlatching actuator configured to unlatch the trunk in response to an activation of the trunk opener switch; and a canceling circuit configured to detect whether said anti-theft warning system is armed or disarmed and, in response to detecting that said anti-theft warning system is armed, to make said trunk unlatching actuator unresponsive to said activation of said trunk opener switch located in the passenger compartment of said vehicle.

20. A trunk unlatching device as claimed in claim 19, wherein said canceling circuit comprises:

a detector configured to detect whether an anti-theft warning function in the anti-theft warning system is set; and a drive circuit activated to make the activation of said trunk opener switch ineffective;

wherein, in response to said detector detecting that the anti-theft warning function is set, said canceling circuit activates said drive circuit to make the activation of said trunk opener switch ineffective, wherein said trunk unlatching actuator is made unresponsive to said trunk opener switch.

21. A trunk unlatching device as claimed in claim 20, wherein said detector detects whether the anti-theft warning function is set based on whether a flag indicating an armed state is set.

22. A trunk unlatching device as claimed in claim 21, wherein said flag is set when said anti-theft warning function is in an armed processing state.

23. A trunk unlatching device as claimed in claim 22, wherein said armed processing state includes an alarm processing state in which an alarm relay is activated for a predetermined time, and wherein said flag is set when said anti-theft warning function is in the alarm processing state.

24. A trunk unlatching device as claimed in claim 20, further comprising a second detector configured to detect whether the anti-theft warning function presently enters a disarmed processing state, and wherein, in response to said second detector detecting that the anti-theft warning function presently enters the disarmed processing state, said canceling circuit de-activates said drive circuit to make the activation of said trunk opener switch effective, wherein said trunk unlatching actuator is responsive to said trunk opener switch.

25. A trunk unlatching device as claimed in claim 22, further comprising a third detector configured to detect whether the anti-theft warning function presently enters an armed preparation processing state, and wherein, in response to said third detector detecting that the anti-theft warning function presently enters the armed preparation processing state, said canceling circuit de-activates the drive circuit to make the activation of said trunk opener switch effective, wherein said trunk unlatching actuator is responsive to said trunk opener switch.

26. A trunk unlatching device as claimed in claim 20, further comprising an ignition key sensor configured to detect whether an ignition key is inserted into an ignition key cylinder, and wherein, in response to said ignition key sensor detecting the ignition key, said canceling circuit de-activates said drive circuit to make the activation of said trunk opener switch effective, wherein said trunk unlatching actuator is responsive to said trunk opener switch.

27. A trunk unlatching device as claimed in claim 20, further comprising a vehicular accessory switch which is activated when a vehicular accessory associated with the vehicular accessory switch is activated, and wherein, in response to said vehicular accessory switch being activated, said canceling circuit de-activates said drive circuit to make the activation of said trunk opener switch effective, wherein said trunk unlatching actuator is responsive to said trunk opener switch.

28. A trunk unlatching device as claimed in claim 19, wherein said anti-theft warning system is incorporated into a keyless entry system and said anti-theft warning function is set on the basis of door locking operations for doors of the vehicle in response to an input of a keyless input code corresponding to a request for the doors of the vehicle to be locked.

29. A trunk unlatching device as claimed in claim 28, further comprising a detector configured to detect whether any door is open, and wherein said anti-theft warning function is set on the basis of the detection by the detector that any door is open.

30. A trunk unlatching device as claimed in claim 28, wherein the anti-theft warning function is set when neither a door unlocking operation nor a trunk unlatching operation is carried out for a predetermined period of time upon an end of the door locking operations through the keyless entry system.

31. A trunk unlatching device as claimed in claim 19, wherein said anti-theft warning function is set on the basis of door locking operations without use of a door key by a user of the vehicle.

\* \* \* \* \*